Patented June 8, 1926.

1,587,704

UNITED STATES PATENT OFFICE.

HENRI DOURIF, OF HUNTINGTON, WEST VIRGINIA.

COMPOSITE PIGMENT AND METHOD OF MAKING THE SAME.

No Drawing.   Application filed April 1, 1924.   Serial No. 703,494.

The present invention relates to a composite pigment and method of preparing same, and the invention is of particular importance in connection with the production of a turquoise blue pigment, from ultramarine blue, and will be described particularly in connection therewith.

It is known that in the production of ultramarine blue, the blue, after being prepared by a chemical process, is ground with water, and there results a colloidal suspension of the ultramarine blue in water, which suspension does not settle out rapidly.

To the said colloidal suspension or semi-colloidal suspension, I add reagents capable of producing another pigment, preferably of another color, and particularly satisfactory results have been produced by precipitation of barium chromate or strontium chromate, or a mixture of these two products on ultramarine blue, while the blue is in the form of colloidal suspension above referred to. For the attainment of such a result, I take, say 100 gallons of the suspension of ultramarine blue, containing 15 to 50 pounds of the actual dry blue, and to this solution, I add a solution of sodium chromate, and a solution of a barium or strontium salt such as the chloride. In place of using sodium chromate, obviously other soluble chromates could be employed, or mixtures of crystallized potassium bichromate or crystallized sodium bichromate and soda ash. Thus, for instance, to the above mixture, I might add 19 lbs. of crystallized sodium chromate, (dissolved in a suitable quantity of water), and then add a solution of 33 lbs. of barium chloride. These two materials can be added in the form of aqueous solutions of say 10 to 15% strength, although it will be understood that the invention is not restricted to the particular strength of either or both of these solutions. It will be understood that instead of first adding the chromate to the suspension of the blue and then adding the barium compound, the latter can be added first, or in some cases the barium compound can be added to one portion of the suspension, while the chromate is added to another portion thereof, the entire mixture being maintained in agitation.

By the reaction of barium chloride and sodium chromate, there is produced not only a precipitate of barium chromate, which is formed in intimate association with the ultramarine blue, but also there is formed an electrolyte in the solution, namely sodium chloride, this latter acting upon the colloidal suspension, or semi-colloidal suspension of the ultramarine blue, to cause a precipitation of the colloidal product, the precipitated blue and the precipitate of barium chromate being formed in a state of intimate association, forming a brilliant and stable turquoise blue pigment. As above stated, in place of barium chloride, strontium chloride, or other strontium salt, which is soluble, can be used. It will be noted that barium chromate and strontium chromate are not exactly the same color, and the color of the composite pigments will, of course, be varied, depending upon whether barium salts or strontium salts are used. Also mixtures of barium and strontium salts can be used to produce intermediate shades of color.

On account of the fact that the chromate is precipitated in a liquid containing the finely divided ultramarine blue, being so fine as to be in substantially a non-settling state of fineness, an extremely intimate mixture of precipitated chromate pigments with the ultramarine blue will be formed, and this precipitate can subsequently be subjected to the same treatment used with ultramarine blue, and can be worked up into a mixed paint in the same manner. It can also be made into a paint paste in the ordinary manner. It may be noted in this connection that the pigment properties of barium and strontium chromates are in many respects similar to those of ultramarine blue, and the composite pigments can accordingly be considered as being in the same class as ultramarine blue itself, and can accordingly be used in any of the paint formulas where ultramarine blue itself is used.

As a modified procedure, the soluble chromate may be added to the soluble barium salt or the soluble strontium salt, separately from the suspension of the ultramarine blue, and the liquid carrying the precipitate can then at once be added to the suspension of the ultramarine blue, and the entire mass stirred up to produce a more or less intimate mixture. In this way, however, there probably is not produced such an intimate mixture as in the cases above referred to, where the precipitation of the chromate takes place in the suspension containing the ultramarine blue.

Whatever be the process followed in mixing the material, the batch is then, after the mixing, allowed to settle, the aqueous solution is drained off, the pigment washed, filtered and dried, and pulverized in the customary manner.

I claim:

1. A process of making a composite pigment, which comprises adding to a suspension containing ultramarine pigment largely in a substantially non-settling state of fineness, a solution containing a chromate and a solution containing a salt of a metal capable of reacting with such chromate with the production of a precipitate of a chromate of such metal, whereby the composite pigment is precipitated.

2. A composite pigment comprising an insoluble chromate precipitated upon and intimately incorporated with fine particles of ultramarine blue.

3. A composite pigment comprising an insoluble chromate of an alkaline earth metal precipitated upon and intimately incorporated with fine particles of ultramarine blue.

4. A composite pigment containing fine particles of ultramarine blue and at least one of the insoluble chromates of barium and strontium, all in a state of intimate incorporation.

5. A process of making a composite pigment, which comprises adding to a suspension containing ultramarine blue pigment largely in a substantially non-settling state of fineness, a solution containing a chromate and a solution containing a salt of an alkaline earth metal capable of reacting with such chromate with the production of a precipitate of a chromate of such metal, whereby the composite pigment is precipitated.

In testimony whereof I affix my signature.

HENRI DOURIF.